United States Patent [19]
Bitecola

[11] 3,857,747
[45] Dec. 31, 1974

[54] ARTIFICIAL SHRUBS

[76] Inventor: Daniel Bitecola, 1095 Abbott Blvd., Fort Lee, N.J. 07024

[22] Filed: Mar. 14, 1972

[21] Appl. No.: 234,626

[52] U.S. Cl................ 161/21, 47/41, 161/19, 161/22, 161/31, 248/27.8, D35/1, 206/423, 206/DIG. 811

[51] Int. Cl................ A41g 1/00

[58] Field of Search............... 161/19–31, 161/15, 50, 53; 156/61, 91, 92; 248/27.8; 229/DIG. 7; 47/41; D29/28 R; D35/1, 3 A, 3 R

[56] References Cited
UNITED STATES PATENTS

| | | | |
|---|---|---|---|
| 1,555,795 | 9/1925 | Caparell | 161/23 |
| 2,230,861 | 2/1941 | Buehler | 119/1 |
| 3,099,244 | 7/1963 | Knapp | 116/63 |
| 3,105,457 | 10/1963 | Krueger | 116/63 P |
| 3,170,587 | 2/1965 | Beeber | 161/31 X |
| 3,243,336 | 3/1966 | Auge | 161/27 |
| 3,419,455 | 12/1968 | Roberts | 161/7 |
| 3,498,520 | 3/1970 | Zumpel et al. | 229/8 |
| 3,682,347 | 8/1972 | Barrier | 220/16 |
| 3,682,753 | 8/1972 | Willinger | 161/18 |
| 3,744,454 | 7/1973 | Willinger et al. | 161/19 |

*Primary Examiner*—George F. Lesmes
*Assistant Examiner*—Henry F. Epstein
*Attorney, Agent, or Firm*—Burgess, Dinklage & Sprung

[57] ABSTRACT

An artificial shrub comprising a centrifugally molded high density polyethylene shell about 0.1 to 0.25 inch thick to which foliage sprays are stapled in multitiered fashion. The shell sits in or is integral with a channel member which can seat over the open mouth of a pot or be placed on the ground. Spikes can join the shell and channel member to each other as well as to the pot or ground. Rain water is prevented from entering the pot. Different shells, foliage sprays, channel members and pots may be used with one another for a variety of combinations.

9 Claims, 14 Drawing Figures

PATENTED DEC 31 1974 3,857,747
FIG. 1.
FIG. 2.
FIG. 3.
FIG. 4.
FIG. 5.
FIG. 6.
FIG. 7.
FIG. 8.
FIG. 9.
FIG. 10.
FIG. 11.
FIG. 12.
FIG. 13.
FIG. 14.
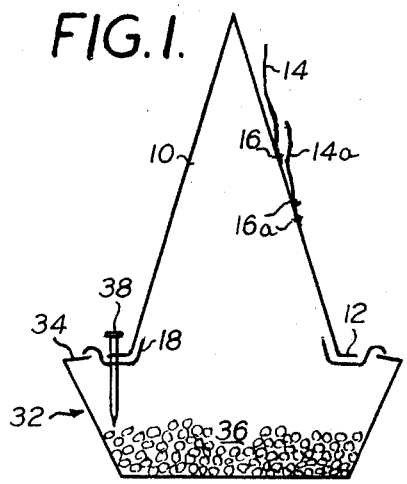
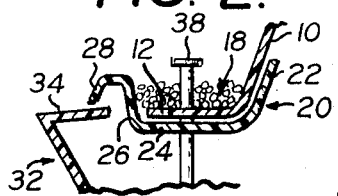
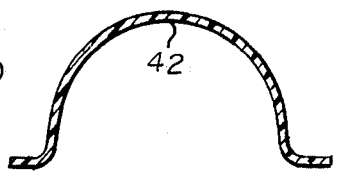
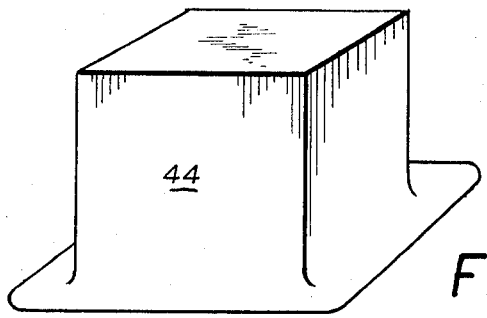
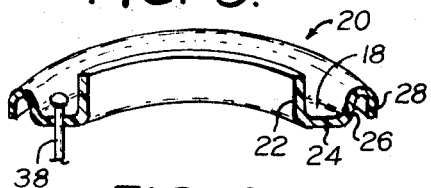
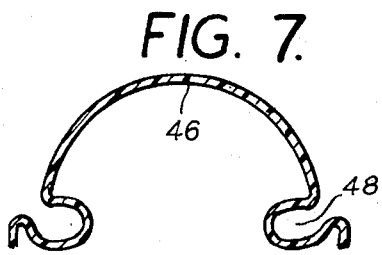
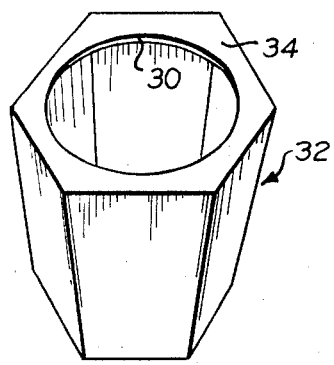
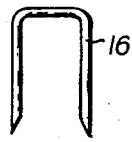
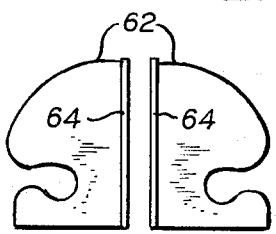
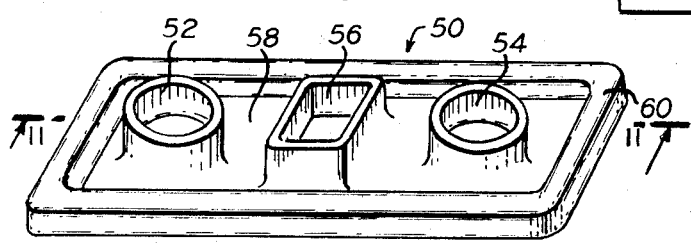
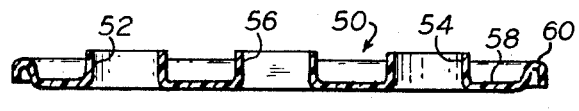
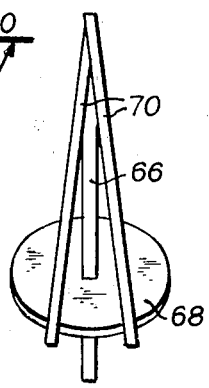
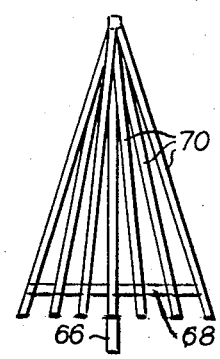

ARTIFICIAL SHRUBS

This application relates to the production of artificial shrubs such as small evergreen trees or bushes.

Shrubs such as trees or bushes are widely used for decorative effect in landscaping homes and businesses. Occasionally they are even placed indoors for similar purposes and at Christmas-time they are frequently found indoors, often after having had their trunks severed. To maintain the esthetic effect it is necessary that the shrubs be properly watered, nourished or fertilized, they have adequate drainage, the soil acidity be maintained, they receive adequate light, they be protected from pests such as destructive insects, that they be protected from excessive exposure to undesirable atmospheric conditions such as fumes from the surrounding environment, that they be trimmed to remove scraggily growth, and the like. Some shrubs, e.g. camelias, magnolias, etc. will not grow in certain latitudes because of the severe winter climates; others will not grow where it is too warm in summer. Clearly, therefore, such shrubs require a great deal of care and attention, which is obviously costly, and still there are limits on the use of such shrubs.

Artificial shrubs have been used to some extent indoors as Christmas trees but they have not really been intended to duplicate natural shrubs, at best only simulating them. Because of their seasonal use primary concern has been directed toward making them easy to assemble and disassemble so that the user could store his tree in a minimum amount of space when not in use. They have not been suited for outdoor use because they could not withstand rain or wind, or vandalism or even outright theft. If potted outdoors, the pots were subject to cracking after filling with water and then freezing.

More life-like artificial shrubs have been desired, however, to avoid the costly care and maintenance noted above. Various methods of manufacture have been devised for such purposes. One system involves producing foliage sprays on conventional brush-making equipment, the foliage having bristles projecting radially from a wire axis as in a brush. The foliage resembles pine branches and special means are provided for joining the branches to the tree trunk. While suitable for certain purposes, such shrubs are relatively expensive to produce and are limited in variety of appearance and shape.

Another form of artificial shrub involves use of a perforated core of the general shape desired. Foliage sprays, usually of plastic although possibly natural, are inserted into the perforations to give a life-like appearance. Since the core can have a variety of shapes and the sprays can have a variety of configurations, e.g. pine, hemlock, ewes, etc., this system permits a fairly wide latitude in shapes and varieties. The system, however, is not suited for outdoor use because the sprays can be removed easily so that vandalism is a problem. In addition, storage of the cores is a problem because of their size and weight; the manufacturer who must have a large inventory finds this especially troublesome.

In a variation of the above, the core comprises a chicken wire base of the general configuration desired, the chicken wire being applied to a preformed frame of wood. Hog rings are used to clip the foliage sprays to the chicken wire. This is costly because of the need for making a frame and draping it with chicken wire. Moreover, the exposed wire is subject to rusting whereupon it will discolor and ultimately fall apart.

It is accordingly an object of the present invention to provide a simplified method for making artificial shrubs of a variety of shapes, types and sizes, for use indoors and outdoors.

It is a further object of the invention to produce artificial shrubs which are reasonably vandal-proof and weather-proof.

Another object is to produce artificial shrub components which can be stored in a minimum of space, which are light in weight, and which can be used interchangeably to give a variety of combinations of pots, shrubs, borders, and the like.

These and other objects and advantages are realized in accordance with the present invention pursuant to which there are provided artificial shrubs comprising a hollow downwardly open-mouthed plastic shell, a multiplicity of foliage sprays overlying said shell and obscuring it from external view, and a plurality of staples projecting from outside said shell into the hollow thereof to secure each of said sprays in predetermined position relative to said shell. Said shell sits in or is integral with an upwardly open annular channel member which serves as the means for joining the shrub to a soil-like sub-surface such as a pot or the ground. If a pot is to be employed it, too, can be molded to have an upwardly open mouth to receive and hold the channel member. The channel member and shell cover the mouth of the pot so that rain water cannot enter so the pot need not be filled to keep out rain water, although a small amount of fill is desirable for weight. Spikes may be used to secure the shell and/or channel member to the pot and/or ground.

In an alternative arrangement the plastic shell comprises one or more layers of plastic film wrapped about a wooden, metal, wire or even plastic frame or grid.

The invention will now be described more fully with reference to the accompanying drawings, wherein:

FIG. 1 is a schematic sectional view of a potted artificial shrub in accordance with the invention;

FIG. 2 is a fragment of the left side of FIG. 1 on an enlarged scale;

FIG. 3 is a diametrical sectional view through a hemispherical shell;

FIG. 4 is a perspective view of a cubic shell;

FIG. 5 is a diametrical sectional view of an annular channel member;

FIG. 6 is a perspective view of a pot;

FIG. 7 is a diametrical sectional view through an integral hemispherical shell and channel member;

FIG. 8 is an elevation of one foliage spray;

FIG. 9 is an elevation of a staple for securing a spray to the shell;

FIG. 10 is a perspective view of an alternative channel member for receiving three shrubs;

FIG. 11 is a section on line 11—11 of FIG. 10;

FIG. 12 is an exploded view of an alternative shell comprising two half shells capable of nesting despite undercut shapes;

FIG. 13 is a perspective view showing the manner of forming another embodiment of plastic shell; and FIG. 14 is a side elevation of the embodiment of FIG. 13 at a later stage but before wrapping with plastic film.

Referring now more particularly to the drawings, in FIGS. 1 and 2 there is shown a conical plastic shell 10 having an annular lip 12. Foliage sprays 14, 14a, generally molded of plastic to simulate sprays of any natural shrub, are secured to shell 10 by staples 16, 16a, each of the shape shown in FIG. 9. Thus, working from the top downwardly, sprays 14 are secured about the cone by staples 16 and then another tier or layer of sprays 14a overlaps the lower ends of sprays 14, hiding staples 16 from view and providing a dense foliage structure which obscures shell 10 from external view. The tiering is continued down to the bottom of the shell adjacent lip 12. For ease of illustration, only a few sprays 14 plus associated staples 16 are shown.

As shown in FIG. 2, the lip 12 of shell 10 rests in the upwardly open channel 18 of an annular collar or member 20. The channel member 20, as seen in FIG. 2, comprises an inner wall 22, a base 24, an intermediate wall 26 of lesser height than wall 22 and a downwardly turned wall 28. The channel member 20 sits in the mouth 30 of a pot or planter 32, the mouth being of such size and shape as to receive wall 26 but not to pass wall 28, the channel member and shell being maintained by downwardly sloping rim 34 in elevated condition. If desired, although not necessary, sand or other loose filling material 36 or even concrete, can fill pot 32 in part as a weight or fully to the top as a partial support for the channel member and shell. Spikes 38 may be provided projecting through lip 12 and base 24 to secure the shell 10 to the channel member 20; while even a single spike would suffice, usually at least three will be provided spaced equally about the shrub. The spike 38 may be of such length as to project into the filling material 36 or even through the base of pot 32 into the ground below so as to secure the entire structure to the ground. After the spikes have been driven, a filler 40 such as pebbles, soil, wood chips or bark is placed in channel 18 for decoration and to cover spikes 38.

Rain running down shell 10 will fill channel 18. Because intermediate wall 26 is not as high as inner wall 22, such rain will spill over wall 26 even if water should get inside shell 10 between the shell and wall 22, and will then spill over onto pot 32. Because portion 34 slopes downwardly the rain water will run down the outside of pot 32 rather than into it. If desired, the pot 32 could be provided near its base with a small hole (not shown) so that any water which might accidently enter the pot would drain out; if spike 38 were long enough the hole it made might also permit such drainage if the hole were not fully closed by the spike.

If desired, the shell 10 and channel member 20 can be placed directly on the ground rather than in a pot. In such event the channel member would serve to provide a decorative border about the shrub which would prevent a lawn mower from hitting the shell.

As shown in FIG. 3, the shell may be generally hemispherical as at 42 or, as in FIG. 4, it may be cubic as at 44. The channel member annulus will of course be correspondingly shaped. The external perimeter of the channel member is shown as round but it, too, can be of varied shape and, if a pot is used, its mouth will match the outer shape of the channel member. The width of the channel 18 can be varied, i.e. a set of channel members may be provided each with a channel of different width. Quite possibly the perimeter of inner wall 22 may be different from that of the wall 28 with one square and the other round, for example. Similarly, pot 32 may be of round or hexagonal or inverted frusto-conical external shape. In this fashion from a relatively few sizes and shapes of shells, channel members, pots and foliage sprays it is possible to assemble a large number of shrubs of different botanical variety, size, shape and decorative border.

The conical shells 10 can nest in storage, i.e. one can fit inside the other, so that a minimum amount of space is required. If the foliage is first applied this will increase the space required but it will still be possible to effect nesting. This applies as well to hemispherical shells 42.

In an alternative configuration in FIG. 7, a hemispherical shell 46 is made integral with a channel member defining an undercut channel 48 terminating in an upturned outer rim. This upturned rim is not as well suited for use with a pot as a downturned rim nor is it as decorative but it requires less material. The undercut channel 48 gives a more natural appearance since the shrub foliage does not actually rest immediately on top of the filler in the channel. By being integral it is less expensive to make the molding and there is one less space for water to seep in but a given number of possible variations in shell and channel member combinations requires a greater number of molds and inventory of moldings.

In another embodiment of the invention as shown in FIGS. 10 and 11, there is provided a channel member 50 of rectangular shape to be received in a similar pot, not shown. The channel member is provided with a plurality of cut-outs to receive a plurality of shrubs for a window-box or hedge-type arrangement. Thus, there are two circular openings surrounded by inner walls 52 and 54 and a square opening surrounded by inner wall 56. The intermediate and outer walls 58, 60 rise to a height lower than walls 52, 54 and 56 and the area between the various walls constitutes the channel 60. More or differently shaped shrubs can be similarly accommodated.

In still another arrangement wherein it is desirable to have an undercut such as at 48 in FIG. 7, special means may be provided to permit nesting nonetheless. Thus, as shown in FIG. 12, the shell 46 of FIG. 7 may be replaced by two identical half shells 62 which are provided on their flat meeting faces with outwardly projecting lips 64. Thus, a stack of such members may be nested and when assembly is desired two such half shells 62 are positioned facing one another and are joined by stapling through their meeting lips 64.

In the embodiment of FIG. 13 the plastic shell comprises a film wound about a core or form, rather than a molding. Thus a rod such as a 2 × 2 inch wooden member 66 is secured to a round disc 68 provided with a hole to receive the rod. Vertical slats or firring strips 70 are secured as by nailing to rod 66 at its top and to the periphery of disc 68. The rod has only four sides but sixteen or more strips 70 can be provided in which case four or more top ends of different strips will overlie one another at the top, the assembly having the appearance shown in FIG. 14. The assembly forms a core or form for a plastic shell formed by wrapping with plastic film so that the structure in general form and function resembles shell 10 of FIG. 1. Foliage can then be stapled to the plastic film where it is supported by a strip 70.

While the rod 66 has been shown as projecting downwardly below the plane of disc 68 so it can be supported in the same manner as a Christmas tree trunk, the rod 66 need not project below disc 68 so the strips 70 are the lowest portion, suited for seating in an appropriate channel member. The form supporting the shell comprising plastic film can be made of materials other than wood, e.g. metal wire or even plastic.

In accordance with a special feature of the invention, the plastic shells 10 are molded of polyolefins such as high density polyethylene, polypropylene, and the like, the shells ranging in thickness from about 0.1 to 0.25 inch. These materials are especially capable of receiving and holding metal staples expelled from staple guns; thus if one tries to rip a spray of foliage from the shell it will be found that the staple holds into the shell so securely that ripping is not practically possible. By contrast, low density polyethylene and polypropylene are not stiff enough and their flexibility permits the spray to be ripped off due to movement of the staple; they can be used, however, if special staples are employed which will splay outwardly so as to resist being pulled out by a tug on the spray. It is even possible to use fusion joinder of the sprays to the shell. Foamed polystyrene or fiberglass reinforced polyester also will not hold a staple and unfoamed polystyrene or reinforced polyester frequently shatter upon driving thereinto of a staple. Polyvinylidenechloride may be used but the staple actually punches out material rather than merely pushing it aside so the grip is not as good; moreover, when material is punched out, minute cracks form about the hole and further cracking will progressively occur. The unique cooperation of crystalline high density polyolefins and metal staples such as rosin coated, copper coated and tempered chisel ended staples is thus especially beneficial since they are inexpensive and easy to work with.

Thickness of more than about 0.25 inch are unnecessarily wasteful of material, increase the weight and impede penetration of the staple. Thicknesses less than about 0.1 inch are not stiff enough to resist pulling out of sprays due to inadequate gripping of the staples. If desired, the shell may be pigmented, e.g. with green pigments, so that its foliage will appear even more dense. The shell may also be textured or delustered so as not to reflect light and dispel the illusion of a full natural shrub.

The channel members may be formed of any material but of course are preferably molded. They may have to pass spikes 38 but to that end holes may be provided since the spikes are much larger than staple legs in cross-section. Similarly, the pots may be formed of any plastic or even of concrete although the latter is not necessary. Quite conveniently, these may also be molded of polyolefins and may be pigmented, as desired.

These preferred molding materials also lend themselves to centrifugal molding which is especially desirable since molds therefor are less expensive than for injection molding, for example, and satisfactory quality moldings can be obtained easily and inexpensively.

As noted, the invention is especially applicable to joining the sprays to the shell by stapling but other joinder techniques such as forcing through perforations can also be used while still realizing the benefit of shells which can be molded, nested and combined with a variety of channel members and plants.

Unlike most other systems there is no need for a central trunk and branches extending the full distance from trunk to shrub exterior. As a result fewer foliage sprays are required and less labor of application is involved. The simplicity of assembly lends the novel structures to being almost completed at the factory with only simple operations being required on-site if the shrubs are to be located on a lawn.

As employed herein, a spray is a small branch of foliage and is intended to embrace as well those very small branches known in the trade as picks. The sprays are usually molded plastic but they could of course be natural if desired. These sprays may be applied in multi-tiered fashion as shown in the drawings or strips of foliage can be laid in horizontal or vertical rows. It is even possible to use a continuous garland of foliage which can be used to wrap the shell.

It will be appreciated that the instant specification is set forth by way of illustration and not limitation, and that various modifications and changes may be made without departing from the spirit and scope of the present invention.

What is claimed is:

1. An artificial shrub comprising a hollow downwardly open-mouthed plastic shell, a multiplicity of foliage sprays overlying said shell and obscuring it from external view, each of said sprays having a free upper end and a fixed lower end, a plurality of staples projecting from outside said shell into the hollow thereof and fixing said lower ends of said sprays to said shell, said sprays being arranged in tiers so that the free ends of the sprays of one tier hide the staples securing the sprays of the next higher tier, and an upwardly open annular channel member serving as the means for joining said shrub to a soil-like sub-surface such as a pot or the ground.

2. A shrub according to claim 1, including subdivided decorative border material in said channel member.

3. A shrub according to claim 1, wherein said shell and said channel member are integral.

4. A shrub according to claim 1, including a plurality of such shells bearing foliage and a single channel member, said channel member being provided with a plurality of openings to receive a respective one of said shells.

5. A potted artificial shrub according to claim 1, including a hollow pot having an upwardly open mouth of a shape corresponding to said channel member and in which said channel member sits and by which said channel member is held in predetermined position, said shell and channel member closing off the interior of said pot from the outside so that rain is prevented from getting into the pot.

6. A shrub according to claim 1, wherein said shell comprises molded high density polyolefin of about 0.1 to 0.25 inch thickness.

7. An artificial shrub comprisng a hollow downwardly open-mouthed molded plastic shell, a multiplicity of foliage sprays overlying said shell and obscuring it from external view, a plurality of staples projecting from outside said shell into the hollow thereof to secure each of said sprays in predetermined position relative to said shell, an upwardly open annular channel member receiving the bottom of said shell, a hollow pot having an upwardly open mouth of a shape corresponding to said channel member and in which said channel member is held in predetermined position, said shell and channel member closing off the interior of said pot from the outside so that rain is prevented from getting into the pot, and subdivided decorative border material in said channel member and weighted matter occupying less than the full volume of said pot.

8. A shrub according to claim 7, wherein said shell comprises molded high density polyolefin of about 0.1 to 0.25 inch thickness.

9. A shrub according to claim 8, wherein said polyolefin is polyethylene.

* * * * *